United States Patent [19]
Allan

[11] 3,989,560
[45] Nov. 2, 1976

[54] METHOD OF PREPARING GELLED MONOMETHYLHYDRAZINE

[75] Inventor: Barry D. Allan, Huntsville, Ala.

[73] Assignee: The United States of America as represented by the Secretary of the Army, Washington, D.C.

[22] Filed: Jan. 3, 1966

[21] Appl. No.: 518,492

[52] U.S. Cl. ............................................ 149/36
[51] Int. Cl.² ...................................... C06B 47/08
[58] Field of Search ............................ 149/36, 17

[56] References Cited
UNITED STATES PATENTS

| | | | |
|---|---|---|---|
| 3,077,072 | 2/1963 | Rice | 149/36 |
| 3,116,187 | 12/1963 | Scanlon et al. | 149/36 X |
| 3,164,505 | 1/1965 | Hsieh et al. | 149/36 |
| 3,197,348 | 7/1965 | Skolnik et al. | 149/36 X |
| 3,230,281 | 1/1966 | Carroz | 149/36 X |
| 3,232,801 | 2/1966 | Bost et al. | 149/36 X |

Primary Examiner—Edward A. Miller
Attorney, Agent, or Firm—Nathan Edelberg; Robert P. Gibson; James T. Deaton

[57] ABSTRACT

Liquid monomethylhydrazine is converted to a thiotropic gel by dispersing therein a cellulose or hydroxyalkyl-substituted gelling agent. The gel thus obtained can be handled and stored on board a rocket motor without the hazards associated with liquid monomethylhydrazine.

1 Claim, 1 Drawing Figure

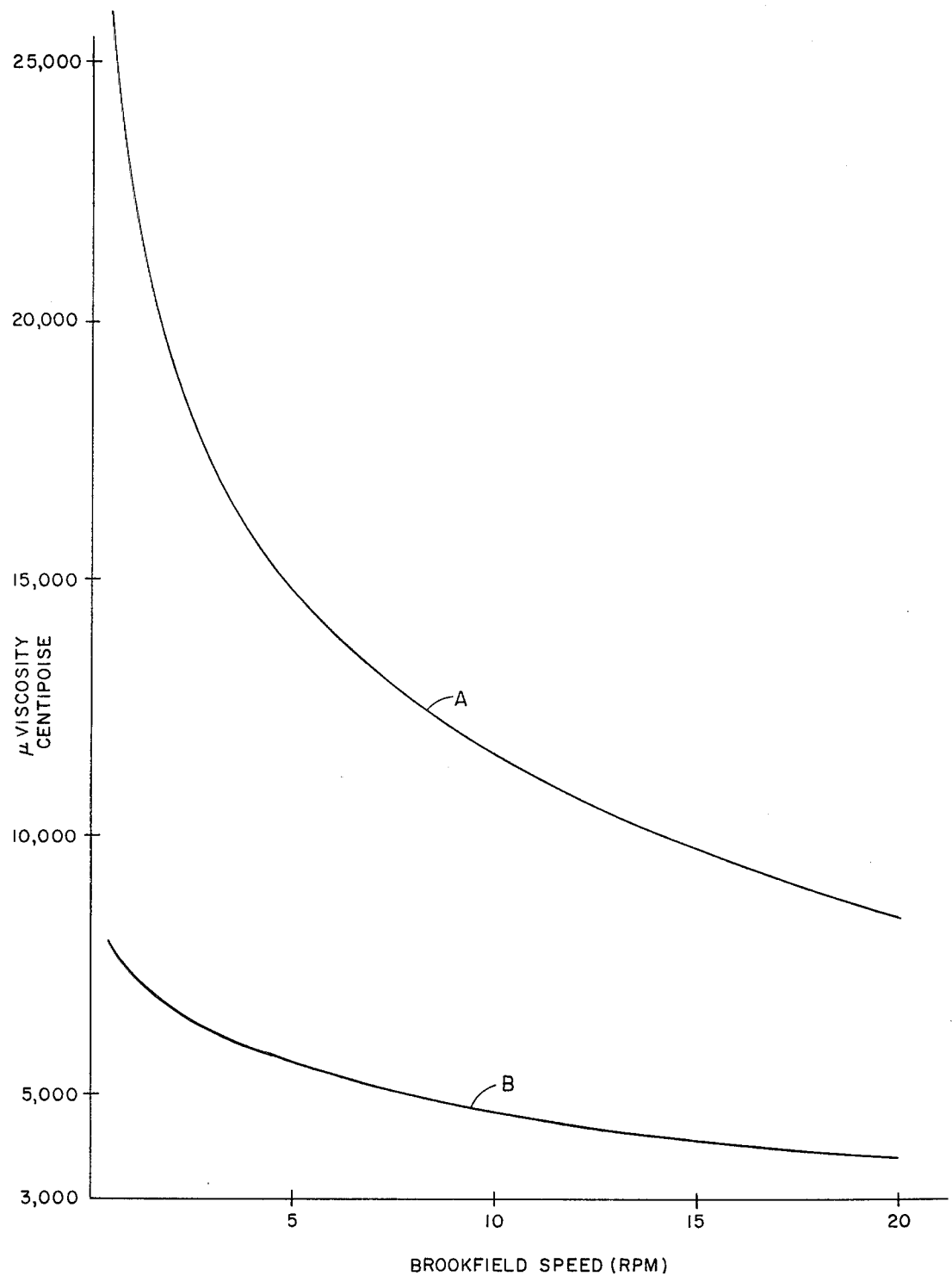

METHOD OF PREPARING GELLED MONOMETHYLHYDRAZINE

The invention described herein may be used by or for the Government for governmental purposes without the payment of any royalty thereon.

This invention relates to rocket fuels and more particularly to gelled monomethylhydrazine.

Monomethylhydrazine, commonly referred to as MMH, is useful as a liquid fuel for rocket motors. MMH exhibits favorable combustion properties when reacted with an oxidizer such as nitric acid, a relatively high specific impulse of 278 seconds (1000 → 14 psia) being obtained.

Serious safety hazards are presented in the use of MMH in liquid form. This material is highly toxic, and when handled as a liquid, extreme precautions must be taken to avoid leakage or escape of fumes. In addition MMH reacts hypergolically with many common materials so that a leak could cause a disastrous fire. These problems could be alleviated by converting the MMH to a thixotropic gel, which behaves as a stable solid until disturbed but flows as a liquid when force is applied.

It is therefore an object of this invention to provide MMH in the form of a thixotropic gel.

Another object is to provide a method of converting liquid MMH to a thixotropic gel.

Other objects and advantages of the invention will be apparent from the following detailed description and the accompanying Figure which is a graph showing the effect of varying amounts of gelling agent on the viscosity of MMH.

In accordance with the present invention liquid MMH is converted to a thixotropic gel by dispersing therein a cellulose or hydroxyalkyl-substituted gelling agent. The gel thus obtained can be handled and stored on board a rocket without the hazards associated with liquid MMH. The thixotropic character of the gel allows pumping of the MMH into the combustion chamber of the rocket motor by application of moderate stress with conventional equipment.

Any cellulose or hydroxyalkyl-substituted gelling agent may be employed, and the following commercially available gelling agents, listed by their chemical composition and trade mark designation, are preferred: hydroxyl methyl cellulose containing 27.5 to 31.5 weight per cent methoxyl groups, Methocel; hydroxypropyl methyl cellulose containing 28 to 30 weight per cent methoxyl groups and 7 to 12 weight per cent propoxyl groups, Methocel HG-60; hydroxypropyl methyl cellulose containing 19 to 24 weight per cent methoxyl groups and 4 to 12 weight per cent propoxyl groups, Methocel HG-90; dihydroxyethyl cellulose, cellosize and hydroxypropyl cellulose containing about 4.6 propoxyl groups per glucose unit, Klucel. In general, the above preferred gelling agents are hydroxyalkyl-substituted celluloses.

The gelling agent is provided in an amount sufficient to impart thixotropic character to the MMH, a room-temperature viscosity of at least 15,000 centipoise being required, and 30,000 to 50,000 centipoise being preferred. For the preferred gelling agents given above 0.8 to 3 weight per cent gelling agent in the mixture is suitable for this purpose. The viscosity can be controlled by varying the amount of gelling agent, higher viscosities being obtained by larger amounts.

The MMH gel is prepared by thoroughly mixing the gelling agent in the MMH. The gelling agents mentioned above, are normally available as finely divided powder which disperses readily in the MMH so that mixing is easily effected in conventional equipment.

This invention is further illustrated by the following example.

EXAMPLE

Varying amounts of hydroxypropyl-substituted cellulose containing 4.6 propoxyl groups per glucose unit (Klucel) were dispersed in 100 millileter portions of MMH. The viscosities of the resulting mixtures were determined at varying spindle speeds in standard Brookfield viscosity tests. The results obtained are depicted in the accompanying Figure. Curve A shows viscosity values for mixtures containing 2.0 grams gelling agent, and curve B shows the values for mixtures containing 1.6 grams gelling agent. It may be readily seen that the viscosity desired for imparting thixotropic character to MMH can be readily obtained by addition of a small amount of gelling agent.

The above example is merely illustrative and is not to be understood as limiting the scope of this invention, which is limited only as indicated by the appended claims.

What is claimed is:

1. The method of converting liquid monomethylhydrazine to a thixotropic gel which comprises dispersing therein a sufficient amount of a gelling agent to produce a viscosity of at least 15,000 centipoise, said gelling agent being methyl cellulose containing 27.5 to 31.5 weight per cent methoxyl groups, hydroxypropyl methyl cellulose containing 28 to 30 weight per cent methoxyl groups and 7 to 12 weight per cent propoxyl groups, hydroxypropyl methyl cellulose containing 19 to 24 weight per cent methoxyl groups and 4 to 12 weight per cent propoxyl groups, dihydroxyethyl cellulose or hydroxypropyl cellulose containing about 4.6 propoxyl groups per glucose unit.

* * * * *